US010356505B2

(12) United States Patent
Rabb et al.

(10) Patent No.: US 10,356,505 B2
(45) Date of Patent: Jul. 16, 2019

(54) ADJUST TRANSMIT POWER BASED ON TOUCH DETECTION

(71) Applicant: Google LLC, Mountain View, CA (US)

(72) Inventors: Laura Rabb, San Jose, CA (US); David Sparks, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/810,490

(22) Filed: Nov. 13, 2017

(65) Prior Publication Data

US 2019/0149906 A1 May 16, 2019

(51) Int. Cl.
*H04R 1/10* (2006.01)
*H04R 29/00* (2006.01)
*G06F 3/041* (2006.01)
*H04W 4/80* (2018.01)

(52) U.S. Cl.
CPC ........... *H04R 1/1041* (2013.01); *G06F 3/041* (2013.01); *G06F 2203/04108* (2013.01); *H04R 1/1016* (2013.01); *H04R 2420/07* (2013.01); *H04W 4/80* (2018.02)

(58) Field of Classification Search
CPC ...... H04R 1/10; H04R 1/1016; H04R 1/1041; H04R 3/00; H04R 3/04; H04R 25/30; H04R 25/55; H04R 25/554; H04R 29/00; H04R 2420/00; H04R 2420/07; G06F 3/041; G06F 3/044; G06F 3/041; G06F 2203/04108; H04W 4/80; H04W 76/00; H04W 76/40; H04W 88/06; H04M 1/7253; H04M 1/72519; H04M 2250/02; H04M 2250/12; H04B 17/10
See application file for complete search history.

(56) References Cited

U.S. PATENT DOCUMENTS

| 7,088,959 | B2 | 8/2006 | Ho et al. |
| 8,358,794 | B2 * | 1/2013 | Schulz ................. H04R 25/552 |
| | | | 381/312 |
| 8,781,420 | B2 * | 7/2014 | Schlub .................... H04W 4/12 |
| | | | 455/127.2 |

(Continued)

FOREIGN PATENT DOCUMENTS

| WO | 2012176217 A1 | 12/2012 |
| WO | 2014074177 A1 | 5/2014 |

OTHER PUBLICATIONS

International Search Report and Written Opinon for PCT Application No. PCT/US2018/045577, dated Oct. 29, 2018. 13 pages.

(Continued)

*Primary Examiner* — Thang V Tran
(74) *Attorney, Agent, or Firm* — Lerner, David, Littenberg, Krumholz & Mentlik, LLP (57) ABSTRACT

Attenuation of a wireless signal, particularly a short range wireless pairing signal, is accommodated immediately and automatically by a device in response to detection of presence of an object. When a user provides input to the device, such as by touching the device with a finger, presence of the finger may interfere with a signal emitted from the device. To accommodate for such interference, the device may immediately increase its transmission power upon detection of the finger, without waiting for link quality measurements.

20 Claims, 8 Drawing Sheets

(56) References Cited

U.S. PATENT DOCUMENTS

| | | | |
|---|---|---|---|
| 2012/0142393 A1* | 6/2012 | Won | H04W 52/246 |
| | | | 455/522 |
| 2014/0328488 A1 | 11/2014 | Caballero et al. | |
| 2016/0050633 A1* | 2/2016 | Yun | H04W 52/226 |
| | | | 455/574 |
| 2016/0103522 A1 | 4/2016 | Lo | |
| 2016/0164563 A1* | 6/2016 | Khawand | H04W 52/221 |
| | | | 455/127.2 |
| 2016/0366537 A1 | 12/2016 | Wu | |
| 2017/0090608 A1 | 3/2017 | Vieta et al. | |
| 2017/0181093 A1* | 6/2017 | Lin | G06F 1/1694 |
| 2017/0289929 A1* | 10/2017 | Komulainen | H04W 52/38 |
| 2017/0303026 A1* | 10/2017 | Honeycutt | H04R 1/026 |
| 2018/0014103 A1* | 1/2018 | Martin | H04R 1/1025 |
| 2018/0175944 A1* | 6/2018 | Seyed | H04B 1/3833 |

OTHER PUBLICATIONS

Office Action for Taiwanese Patent Application No. 107128303 dated May 24, 2019. 8 pages.

\* cited by examiner

ADJUST TRANSMIT POWER BASED ON TOUCH DETECTION

BACKGROUND

For some short wave wireless pairing devices, such as Bluetooth headsets or earbuds, users may enter input by touching a portion of the device. However, the user's finger can cause interference with signals transmitted by the device, thereby reducing a quality of the signals and associated content transmitted by the signals. While current Bluetooth specs allow for power control and data rate adjustments based on link quality measurements between the host and the device, by the time such the link quality is measured and adjustments are made, transmitted data has already been lost because of low signal quality.

BRIEF SUMMARY

The present disclosure provides a communication device, including a transmitter adapted to transmit signals, wherein the transmitter transmits the signals at a first power level, an input comprising one or more touch sensors, and a control unit in communication with the one or more touch sensors and the transmitter. The control unit is configured to detect presence of an object contacting the input, and increase a power level at which the transmitter transmits the signals in response to detecting the presence of the object. The device may be, for example, a short-range wireless pairing device. The signals transmitted may be audio signals or other types of signals.

The touch sensors may include a plurality of touch sensors arranged adjacent to one another. The plurality of touch sensors may be operable in either a first mode, in which input to each of the plurality of sensors is added, or a second mode in which input to each of the plurality of sensors is considered independently. The device may be able to distinguish between a short tap and a held input, and only boost signal in response to a held input.

In some examples, an amount by which the power level is increased may vary based on the degree to which the object is contacting the input.

Another aspect provides a method of improving quality of wireless communications for a wireless device. This method includes transmitting, using a transmitter, signals at a first power level, receiving input via one or more touch sensors, detecting, by a control unit, a presence of an object contacting the one or more touch sensors, and automatically increasing, by the control unit, a power level at which the transmitter transmits the signals in response to detecting the presence of the object.

A further aspect of the technology provides a system, including a first device and a second device adapted to wirelessly communicate with the first device. The second device includes a transmitter adapted to transmit signals, wherein the transmitter transmits the signals at a first power level, an input comprising one or more touch sensors, and a control unit in communication with the one or more touch sensors and the transmitter. The control unit is configured to detect presence of an object contacting the input, and increase a power level at which the transmitter transmits the signals in response to detecting the presence of the object. The second device may transmit a request to a first device, the request causing an increase in power level of signals transmitted from the first device to the second device.

DETAILED DESCRIPTION

The technology relates generally to accommodating for attenuation of a Bluetooth signal. In particular, when a user provides input to a communication device, such as a Bluetooth device, by touching the device with a finger, presence of the finger may interfere with a signal emitted from the device. To accommodate for such interference, the device may immediately increase its transmission power upon detection of the finger, without waiting for link quality measurements.

The device may be any type of short range wireless pairing device, such as an earpiece, earbuds, head-mounted display, wearable audio device, or the like. The device may be small, and thus require a small battery. To maximize battery life, the device may as a default transmit at minimum power. However, where the device receives input through a touch of a user's finger, the signals transmitted at minimum power may get lost due to the attenuation caused by the user's finger. This may have a negative impact on audio quality from the device. In some devices, the user's finger may contact an input of the device for an extended period of time, such as while the user is talking, thereby causing prolonged degradation of signal quality. To minimize or prevent loss of signals, the device may immediately increase its transmit power upon detection of the user's finger.

The device may include one or more sensors, transmitters, and a logic unit. The one or more sensors may be touch sensors. Such touch sensors may be positioned relative to an input of the device. For example, the touch sensors may be integrated with, or positioned over, under, or adjacent the input, such that when input is received contact is made with the touch sensors. The logic unit is configured to receive input from the one or more sensors, and trigger changes in power level of the transmitter based on the input. Thus, for example, when a user's finger covers the input, a power level of the transmitter is automatically adjusted in response. In some examples, the logic unit may include a processor, such as a microprocessing unit.

According to one example, the one or more touch sensors may operate in a proximity mode, where multiple adjacent sensors detect touch in different positions. In this mode, the input from the multiple sensors in considered collectively to determine where and/or how hard the user pressed. According to another example, the one or more sensors may operate in a touch mode, in which the sensors act independently. For example, it is determined which of a plurality of sensors was touched.

The one or more touch sensors may detect whether a finger is making a short gesture, such as tapping, or a longer gesture, such as resting on the input. For example, for a short gesture such as a tap, the finger would move away quickly. In that case, increasing the transmit power may not be necessary because of the very short duration of the interference. Accordingly, such short gestures may be ignored.

In some examples, the amount by which the transmit power is increased may vary based on a coverage area of the user's finger. For example, larger fingers may cover a greater surface area of the sensors, and may also create more attenuation. The one or more sensors, detecting this increased coverage, may in turn trigger a greater increase transmit power.

By increasing the transmit power immediately upon detecting the user's finger, signal quality is maintained and fewer signals will be lost. As a result, a quality of audio provided to the user is increased.

Example Systems

Figure 1:
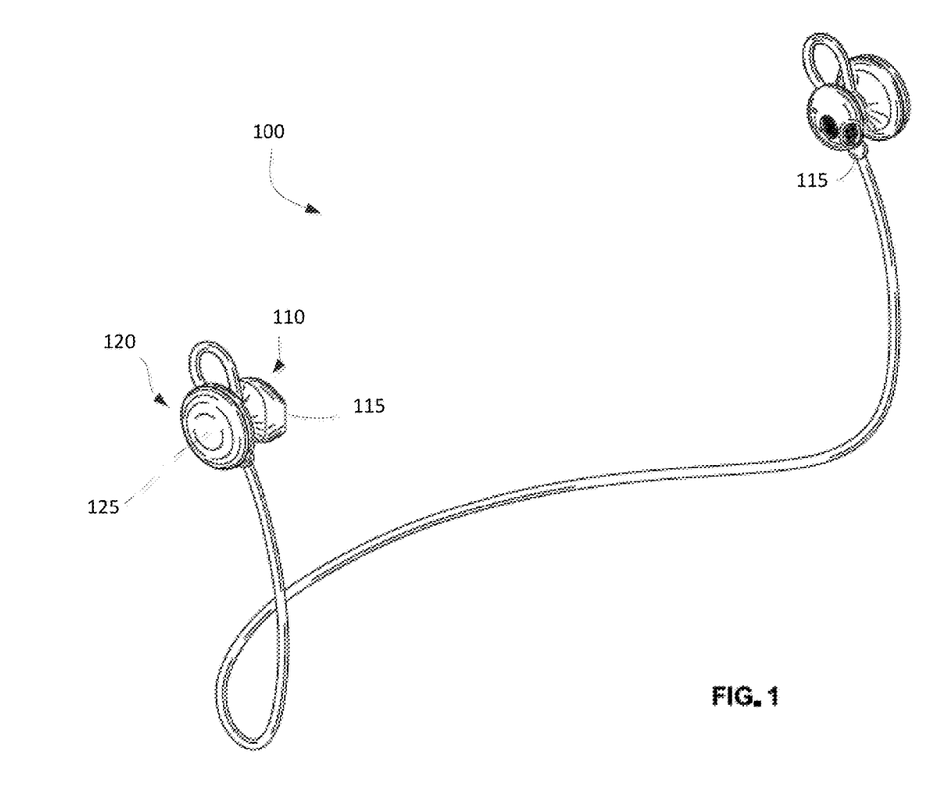
FIG. 1 is a perspective view of an example device according to aspects of the disclosure.

FIG. 1 illustrates an example device 100 capable of wireless signal transmission. In this example, the device 100 is a pair of earbuds. However, in other examples, any of a variety of other devices may be used, such as headsets, head-mounted displays, smart watches, mobile phones, tablets, music players, game consoles, etc.

The device 100 is configured to wirelessly couple with another device, such as a phone, laptop, tablet, music player, or the like. The wireless coupling may be established using any of a variety of techniques, such as Bluetooth, Bluetooth low energy (BLE), etc.

Functions of the device 100 may be manipulated by touch input. For example, while inner portion 110 including speaker 115 are inserted in a user's ear, touch input may be provided to an outer portion 120, such as to outer surface 125. Such touch input may, by way of example only, switch the device 100 to a different mode, such as an input mode where user's voice is detected as opposed to a sound emission only mode. As further examples, the touch input may change a song being played, adjust volume, switch from a music player mode to answer an incoming call, etc. The device 100 may be adapted to perform a plurality of different functions, detecting which function is desired based on a duration of the touch input. For example, whereas a held touch may place the device 100 into voice reception mode, a short tap may change a song being played.

The outer surface 125 may be relatively small, such as roughly the size of a fingertip. As such, a significant portion of the outer surface 125 may be covered by the user's finger during touch input. In this regard, the user's finger may also cover other portions of the device 100, such as a transmitter, antenna, etc. When the user's finger covers portions of the device 100 such as the antenna, it may cause attenuation which degrades a quality of signals transmitted or received by the device 100. Accordingly, when a presence of the user's finger, or any other interfering object, is detected, power of the device 100 may immediately and automatically be increased to boost signals transmitted by the device 100.

Figure 2:
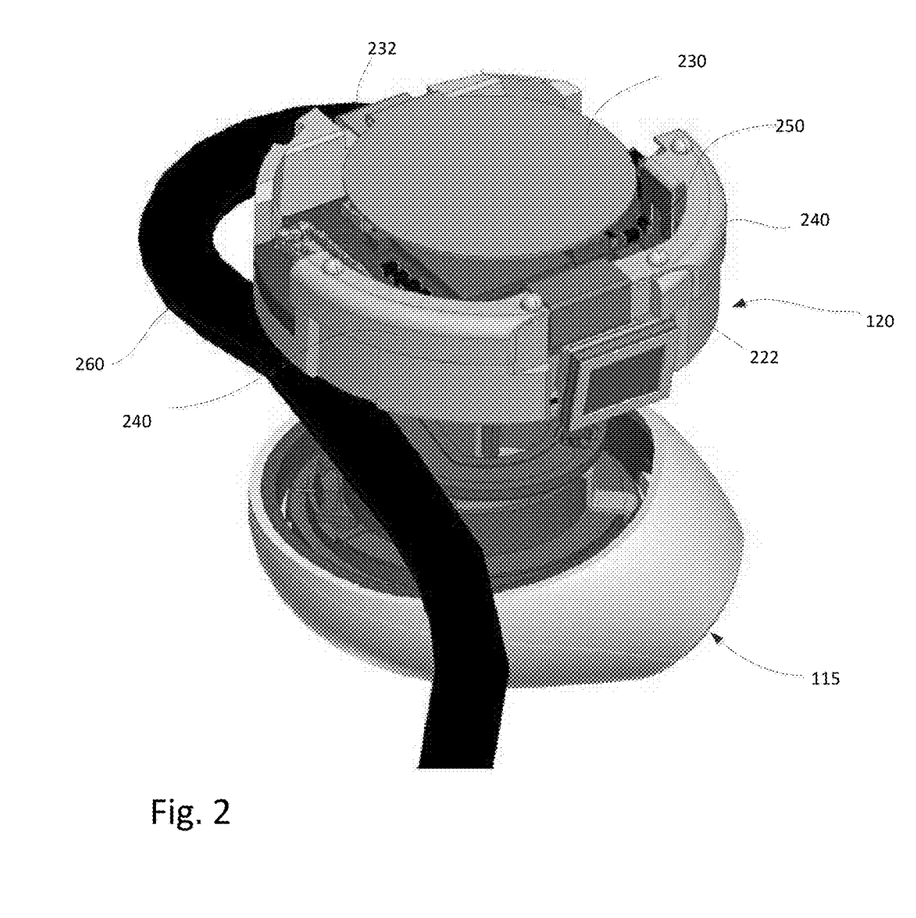
FIG. 2 is a detailed perspective view of part of the device of FIG. 1.

FIG. 2 shows internal components of one of the earbuds of device 100. Such internal components include a touch sensor 230, circuitry 250 and one or more antennas 240. Also shown in cable 260, which may connect one earbud to another earbud, another device, and/or the user. In some embodiments, the cable 260 may be omitted entirely.

The touch sensor 230 as shown is a plate sized and shaped relative to the outer portion 120. Accordingly, the touch sensor 230 in this example is positioned above circuitry 250 adjacent the outer surface (125 of FIG. 1) of the outer portion 120, where touch input is received. In other examples, the device 100 may be designed to receive touch input at a different portion, such as a side or perimeter. In those examples the touch sensor may be correspondingly positioned adjacent where touch input will be received.

The touch sensor 230 in this example is anchored at a base portion 232 of the touch sensor 230 to a housing 222 of the outer portion 120. In this regard, a main portion of the touch sensor 230 hovers above the circuitry 250 and is movable with respect to the housing 222. For example, the touch sensor 230 may be made of a flexible material, such that some bending is permitted near base portion 232 when the sensor is depressed and subsequently the sensor 230 returns to its original position. Examples of such materials include copper, indium tin oxide, silver ink, or any other conductive material. In other examples, the base portion 232 may be anchored in such a way as to provide flexibility, such as by using a spring loaded mount. In such examples, the touch sensor 230 may be made of a more rigid material. In further examples, the touch sensor 230 may be rigid and may not move with respect to the housing 222 or circuitry 250. It should be understood that these are merely a few examples of numerous possible arrangements of the touch sensor.

While the example of FIG. 2 provides for a touch sensor, other types of sensors may additionally or alternatively be included. For example, proximity sensors, light sensors, heat sensors, etc. may be used. Moreover, the touch sensor 230 may be capable of operation in various modes, such as a proximity mode, a touch mode, etc. Such different modes of operation are described below in connection with FIGS. 6A-6C.

The circuitry 250 is in communication with the touch sensor 230, such that input received at the touch sensor 230 is communicated to the circuitry 250. For example, the touch sensor 230 may be electrically coupled to a processor, such that input received at the touch sensor 230 is transmitted to the processor. In some examples, the circuitry 250 beneath the touch sensor 230 may include a component which physically contacts the touch sensor 230 when the touch sensor 230 is pressed. Such a component may then transmit a corresponding signal to a processor.

The circuitry 250 may further include a variety of components which provide for transmission and receipt of wireless signals. In some examples, the circuitry 250 may provide for the transmission and receipt of other signals, such as audio signals emitted through speaker portion 115. The circuitry 250 also provides for adjustment of a power level of transmitted signals in response to input received at the touch sensor 230. For example, the circuitry 250 may automatically amplify signals transmitted by a transmitted when touch input is being received at the touch sensor 230. The circuitry may further cause a signal to be transmitted to a corresponding device which requests that the corresponding device also increase power of its transmitted signals. In this regard, signals received at the device 100, such as at the one or more antennas 240, may also be boosted and received at a higher quality despite interference caused by an object (e.g., a user's finger) temporarily positioned between the corresponding device and the one or more antennas 240.

The antenna 240, as shown, extends around at least a portion of the housing 222. However, various other arrangements of the antenna 240 are possible. Just by way of example, the antenna 240 may extend over a portion of the circuitry 250, similar to the arrangement of the touch sensor 230. The antenna 240 is also in communication with the circuitry 250, as mentioned above. The antenna 240 is adapted to receive wireless signals from one or more wirelessly coupled devices. For example, the antenna 240 may be a Bluetooth antenna capable of receiving signals over an established Bluetooth connection. The antenna 240 may further be adapted to transmit signals to the wirelessly coupled devices. Examples of signals transmitted or received by the antenna 240 include audio signals, video signals, or the like. While two antennas 240 are shown, it should be understood that additional or fewer antennas may be used.

As shown in FIG. 2, the antenna 240 is arranged in close proximity to the touch sensor 230. Such arrangement allows for a reduced overall size of the earbud, and thus increased comfort for a user. However, this arrangement may also result in interference with signals transmitted or received by the antenna 240, such interference caused by a user's finger or other object providing input to the touch sensor 230. Accordingly, upon detection of the presence of such an object, the circuitry 250 may immediately and automatically boost a power level of the signals as mentioned above.

Figure 3:
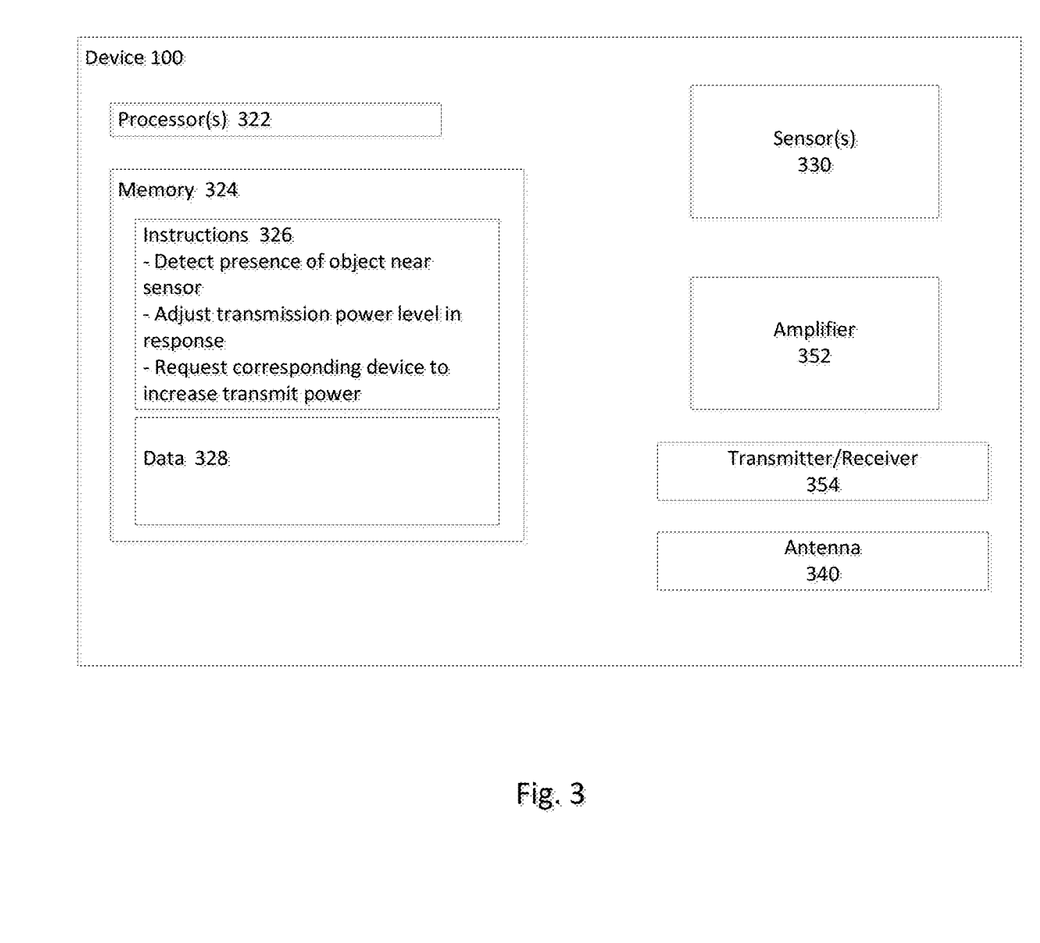
FIG. 3 is a block diagram illustrating an example device according to aspects of the disclosure.

FIG. 3 provides an example block diagram illustrating components of the device 100. As shown, the device 100 includes various components, such as sensors 330, amplifier 352, transmitter/receiver 354, antenna 340. The device 300 further includes one or more processors 322, memory 324, and other components typically present in microprocessors, general purpose computers, or the like.

The one or more processor 322 may be any conventional processors, such as commercially available microprocessors. Alternatively, the one or more processors may be a dedicated device such as an application specific integrated circuit (ASIC) or other hardware-based processor. Although FIG. 3 functionally illustrates the processor, memory, and other elements of device 100 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 100. Accordingly, references to a processor or computing device will be understood to include references to a collection of processors or computing devices or memories that may or may not operate in parallel.

Memory 324 may store information that is accessible by the processors 322, including instructions 326 that may be executed by the processors 322, and data 328. The memory 324 may be of a type of memory operative to store information accessible by the processors 322, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 326 and data 328 are stored on different types of media.

Data 328 may be retrieved, stored or modified by processors 322 in accordance with the instructions 326. For instance, although the present disclosure is not limited by a particular data structure, the data 328 may be stored in computer registers, in a relational database as a table having a plurality of different fields and records, XML documents, or flat files. The data 328 may also be formatted in a computer-readable format such as, but not limited to, binary values, ASCII or Unicode. By further way of example only, the data 328 may be stored as bitmaps comprised of pixels that are stored in compressed or uncompressed, or various image formats (e.g., JPEG), vector-based formats (e.g., SVG) or computer instructions for drawing graphics. Moreover, the data 328 may comprise information sufficient to identify the relevant information, such as numbers, descriptive text, proprietary codes, pointers, references to data stored in other memories (including other network locations) or information that is used by a function to calculate the relevant data.

The instructions 326 may be executed to perform power adjustments using the amplifier 352, transmitter/receiver 354, antenna 340, or other components not shown. For example, the transmitter 354 may transmit signals through the antenna 340 at a predetermined power level. The one or more processors 322 may detect when an object is interfering with the transmitted signals based on input received by the one or more sensors 330. In response to detecting that an object is interfering with the signals, the one or more processors 322 may amplify subsequent signals using amplifier 352 for transmission by transmitter 354. In some examples, the amount by which a power level of the signals is increased may be determined based on factors such as an amount of coverage of the sensor 330, a priority level of the transmitted signals, etc. In further examples, the sensors 330 and/or processor 322 may distinguish between interference that will last a very quick duration (e.g., a short tap on the input by the user's finger) and interference that will be longer (e.g., input is held by user's finger for a threshold period of time, such as long enough for the user to provide voice input). In instances where the interference will last only a very quick duration, such interference may be ignored and amplification of the signals not performed.

It should be understood that the device 100 may include other components which are not shown, such as a battery, charging input for the battery, microphone, speakers, signals processing components, etc. Such components may also be utilized in execution of the instructions 326.

Figure 4:
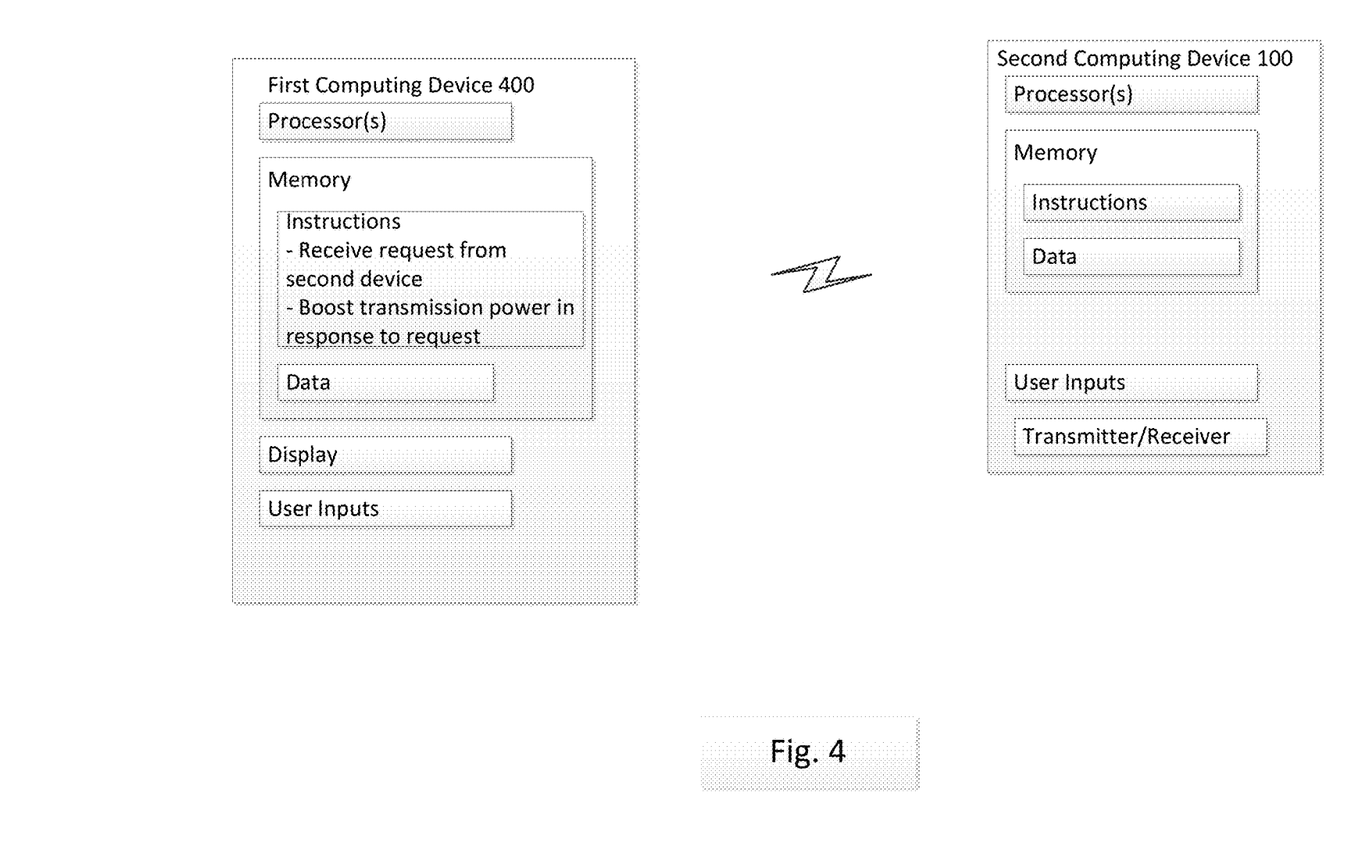
FIG. 4 is a block diagram illustrating an example system including the device of FIG. 3.

FIG. 4 illustrates an example system 400, including a first device 405 adapted to wirelessly communicate with a second device, such as the device 100. The wireless communication may utilize a short range device-to-device communication protocol. In other examples, the communication may take place over a network (not shown), such as a cellular network, the Internet, or the like. The first device 400 may be, for example, a mobile phone, tablet, laptop, game console, or other computing device. The second device 100 may be, for example, an accessory such as earbuds, earpiece, headset, head-mounted display, smart watch, etc.

The second device 100 operates as described above in connection with FIG. 3. The first device 400 may receive the signals transmitted by the second device 100. According to some examples, the first device 400 may also boost a power level of signals transmitted to the second device 100 when the second device 100 detects an object interfering with the wireless communication. For example, when the second device 100 detects interference and automatically boosts a power level of transmitted signals as described above in connection with FIG. 3, the second device 100 may also send a request to the first device 400 requesting that the first device 400 also boost a power level of signals transmitted to the second device 100. The first device 400 may respond by increasing the power level accordingly. The first device 400 may return to transmitting signals to the second device 100 at a default power level when, for example, the second device 100 sends a notification to the first device 400 or after a predetermined period of time.

Figure 5A:
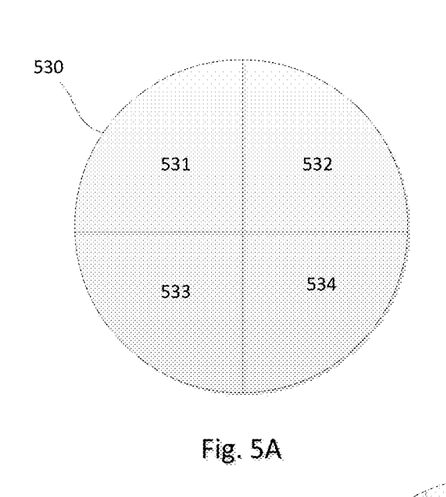
FIGS. 5A-5C illustrate various example sensors in accordance with aspects of the disclosure.
Figure 5B:
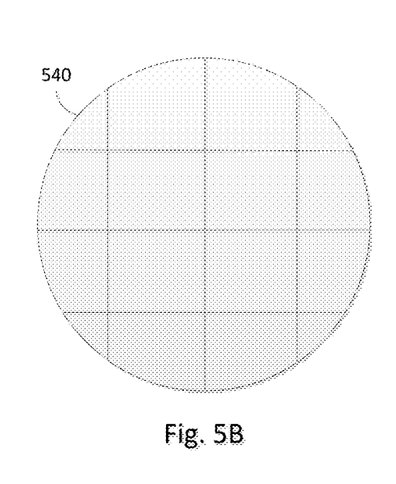
Figure 5C:
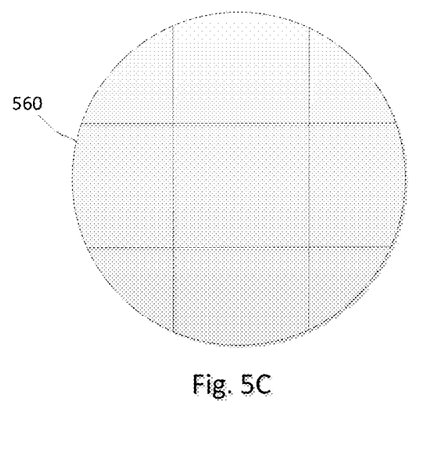

FIGS. 5A-5C illustrate various potential examples of the touch sensor 230 described above in connection with FIG. 2.

The touch sensor 230 may include a plurality of smaller individual sensors positioned adjacent one another, such as in a grid pattern. For example, FIG. 5A illustrates a sensor 530 made of four individual sensors 531-534. FIG. 5B illustrates a sensor 540 made of 16 individual sensors, and FIG. 5C illustrates a sensor 560 made of none individual sensors. It should be understood that any number of individual sensors may be used. In detecting input, the sensors 530, 540, 560 may operate in a first mode or a second mode. The first mode may be, for example, a proximity mode, where all of the individual sensors operate together to serve as one larger sensor. For example, input detected by each of the individual sensors may be added together. A second mode, may be, for example, a capacitive mode, where it is determined which of the individual sensors received input.

Figure 6A:
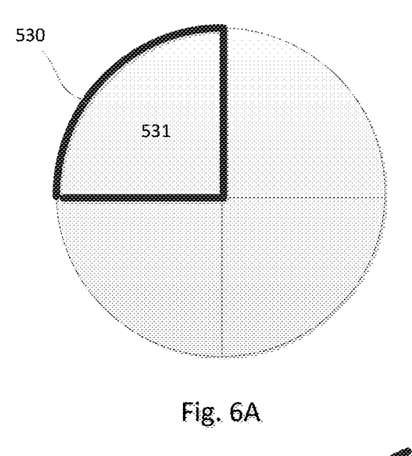
FIGS. 6A-6C illustrates the example sensors of FIGS. 5A-5C operating in a particular mode in accordance with aspects of the disclosure.
Figure 6B:
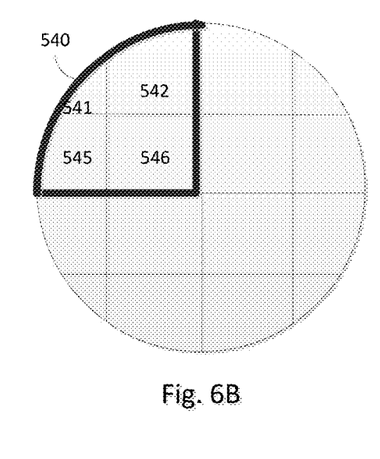
Figure 6C:
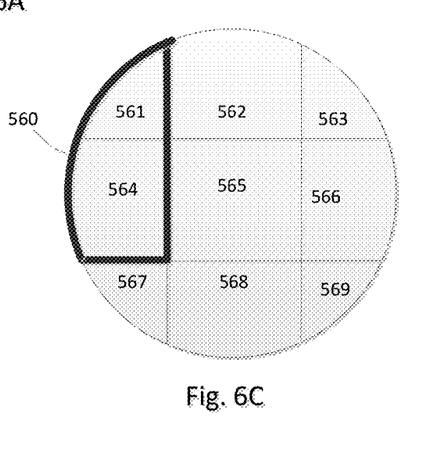

FIGS. 6A-6C illustrate an example of input received in the capacitive mode. As shown in FIG. 6A, a first individual sensor 531 received input, while the other individual sensors did not. Accordingly, it may be determined by a processor in communication with the sensor 530 that the sensor 530 received input in the upper left portion. In some devices, input received at different portions of the sensor 530 may activate different functions. In other examples, determining which portion of the sensor 530 received input may indicate how much surface area of the sensor 530 is covered, and thus how much interference is presented for transmitted signals.

As shown in FIG. 6B, the sensor 540, which includes four times as many individual sensors as the sensor 530 of FIG. 6A, received input at each of individual sensor 541 542, 545, and 546. The area covered by these individual sensors 541, 542, 545, 546 corresponds to the area covered by the individual sensor 531 of FIG. 6A. Accordingly, it may be determined that a same portion of the sensor 540 was pressed.

As shown in FIG. 6C, only individual sensors 561 and 564 received input, while individual sensors 562-563, 565-569 did not. While a same position on the sensor 560 may have been contacted as on the sensors 530, 540, because of the size and arrangement of the individual sensors 561-569, different sensors received input. Accordingly, the number and arrangement of the individual sensors may result in a more or less precise determination of which specific portion of the sensor was contacted.

Figure 7A:
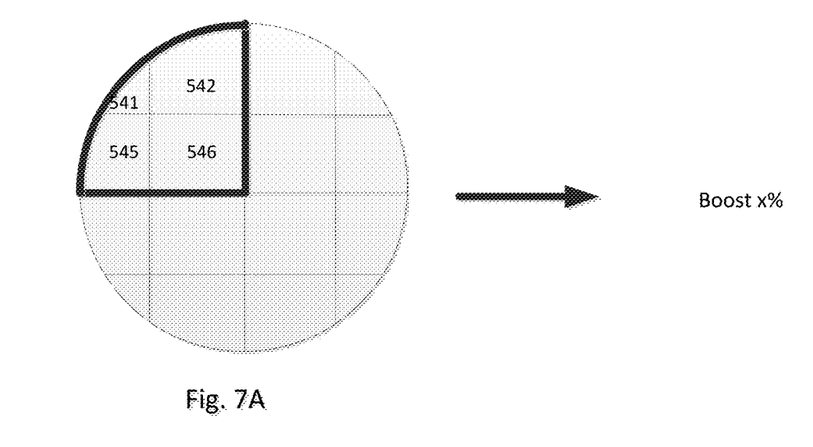
FIGS. 7A-7B illustrate an example of increasing power level of transmitted signals in accordance with aspects of the disclosure.
Figure 7B:
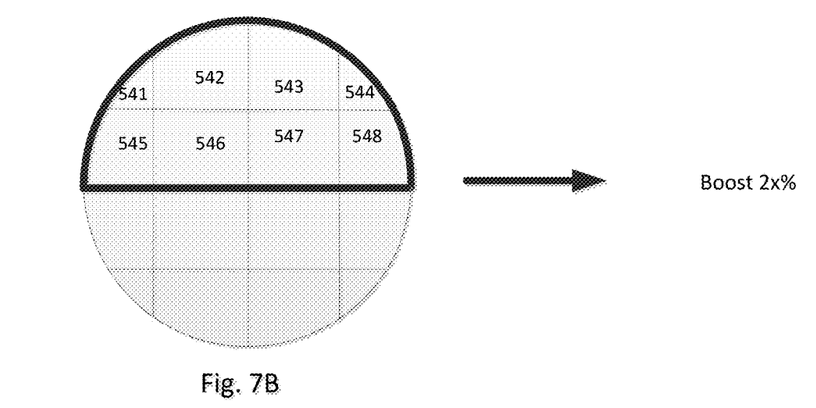

FIGS. 7A-7B illustrate an example, where a surface area of the touch sensor that is contacted affects an amount by which the power level of the transmitted signals is increased. In FIG. 7A, the sensor 540 detects that individual sensors 541, 542, 545, 546 received input. Accordingly, the device boosts the power level of transmitted signals by a predetermined amount, such as x %. In FIG. 7B, however, individual sensors 541-548 each received input, thus indicating a great contact area than in FIG. 7A. This may be a result of, for example, larger fingers, multiple fingers, harder depression, etc. It may also be an indication of increased attenuation caused by an object contacting the sensor, because the object is likely to also cover a great portion of an antenna, such as the antenna 240 of FIG. 2. Accordingly, the device may increase the power level of the transmitted signals even more than in the example of FIG. 7A. For example, the increased may be twice the predetermined amount of FIG. 7A, or 2x %. It should be understood, however, that the amount of increase is not necessarily directly proportionate to the number of individual sensors receiving input or an area covered by the object.

Example Methods

Figure 8:
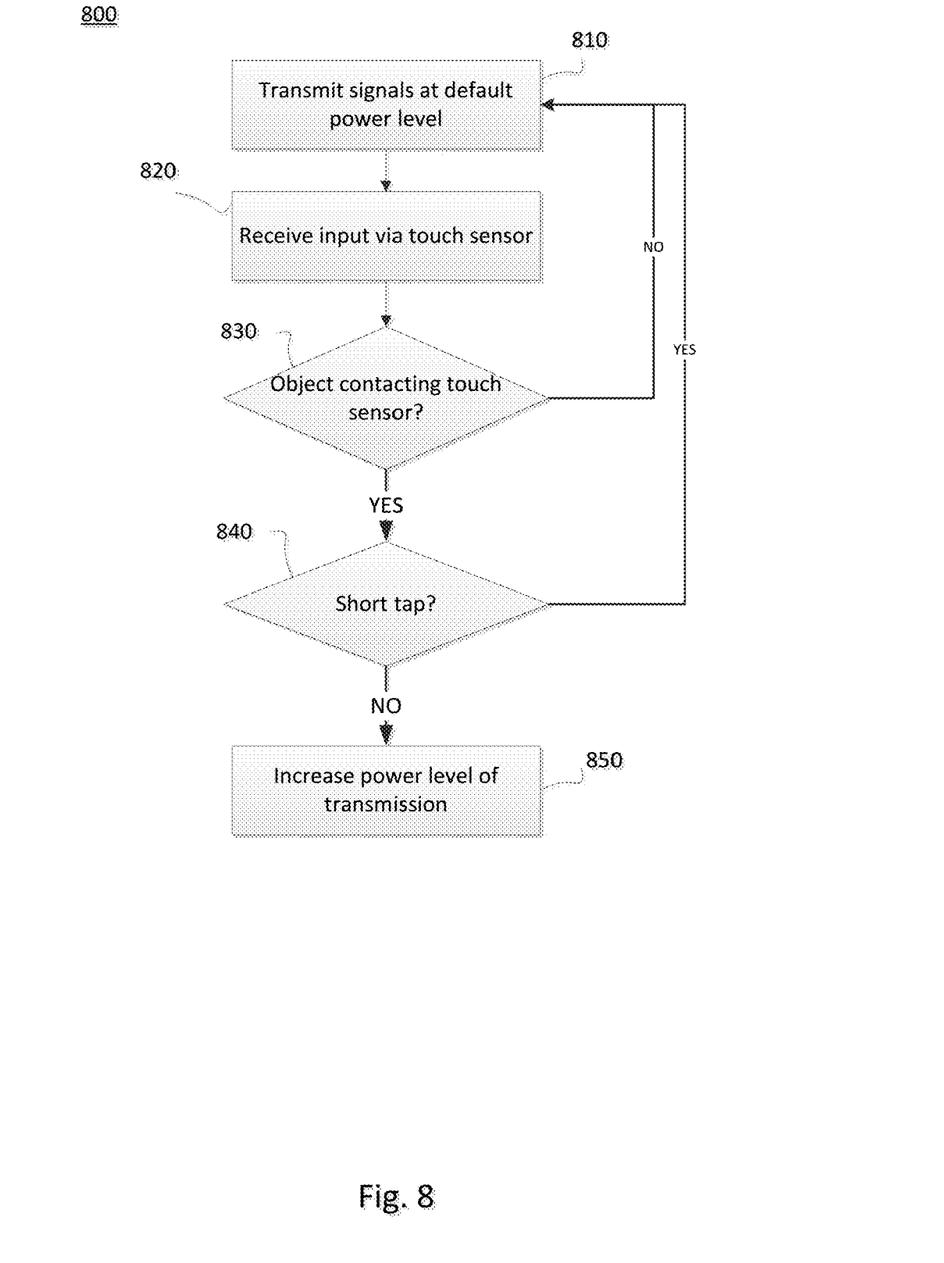
FIG. 8 is a flow diagram illustrating an example method in accordance with aspects of the disclosure.

FIG. 8 illustrates an example method 800 of improving quality of wireless communications for a wireless device according to aspects of the disclosure. The method may be performed with, for example, a wireless device, such as the device 100 of FIG. 1. While parts of the method are discussed in a particular order below, it should be understood that these parts may be performed in a different order. Similarly, operations may be performed simultaneously, some operations may be omitted, and other operations may be added.

In block 810, signals are transmitted at a first power level. The first power level may be a default power level, or a minimum power level needed to transmit signals of a predetermined quality, assuming little or no interference. For devices with particularly small batteries, this may help to preserve battery life.

In block 820, input is received via one or more touch sensors. For example, a user may contact the touch sensor to provide input, such as voice commands, voice signals for transmission over a network, touch commands, etc. Accordingly, it may be determined in block 830 whether an object, such as the user's finger, is contacting the touch sensor. If not, the method 800 may return to block 810. If it is determined that an object is contacting the touch sensor, however, that object may also be causing attenuation of signals transmitted by the device.

In block 840, it may be determined whether the input received at the sensor is only very brief in duration, such as a short tap. In such instances, the object may be removed from a line of interference before any significant data is list in transmission of signals. Accordingly, if it is merely a short tap, the method 800 may continue transmitting signals at the first power level. If contact is made with the sensor for a longer period of time, however, such as long than a predetermined threshold, the device may adapt its transmission to accommodate for attenuation.

In block 850, power level of the transmitted signals is automatically and immediately increased to accommodate for any attenuation presented by the object contacting the touch sensor. In some examples, the amount of increase may consistently be a predetermined amount. In other examples, the amount of increase may be dependent on one or more factors, such as a portion of the sensor being covered, a priority of signals being transmitted, etc.

The examples described above are advantageous in that they provide for improved quality of signals transmitted while preserving battery life. Accordingly, a user experience is improved, and communications may continue with minimal or no loss of data caused by input interference.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication device, comprising:
  a transmitter configured to transmit signals, wherein the transmitter transmits the signals at a first power level;

an input comprising one or more touch sensors; and
a control unit in communication with the one or more touch sensors and the transmitter, the control unit configured to:
    detect presence of an object contacting the input; and
    increase a power level at which the transmitter transmits the signals in response to detecting the presence of the object.

2. The communication device of claim 1, wherein the communication device is a short-range wireless pairing device.

3. The communication device of claim 1, wherein the signals transmitted by the transmitter are audio signals.

4. The communication device of claim 1, wherein the one or more touch sensors comprise a plurality of touch sensors arranged adjacent to one another.

5. The communication device of claim 4, wherein the plurality of touch sensors are arranged in a grid configuration.

6. The communication device of claim 4, wherein the plurality of touch sensors are configured to operate in either a first mode, in which input to each of the plurality of sensors is added, or a second mode in which input to each of the plurality of sensors is considered independently.

7. The communication device of claim 1, wherein the control unit is further configured to:
    determine whether the object will remain in contact with the input or whether the object will immediately move away from the input; and
    ignore the presence of the object when it is determined that the object will immediately move away from the input.

8. The communication device of claim 1, wherein the control unit comprises a microprocessor.

9. The communication device of claim 1, wherein the control unit is further configured to:
    determine a degree to which the object is contacting the input; and
    determine an amount by which to increase the power level based on the degree to which the object is contacting the input.

10. The communication device of claim 1, wherein increasing the power level at which the transmitter transmits the signals is independent of signal quality measurements of signals received at the communication device.

11. A method of improving quality of wireless communications for a wireless device, comprising:
    transmitting, using a transmitter, signals at a first power level;
    receiving input via one or more touch sensors; and
    detecting, by a control unit, a presence of an object contacting the one or more touch sensors; and
    automatically increasing, by the control unit, a power level at which the transmitter transmits the signals in response to detecting the presence of the object.

12. The method of claim 11, wherein the transmitting comprises transmitting short-range wireless signals to a paired device.

13. The method of claim 11, wherein the transmitting comprises transmitting audio signals.

14. The method of claim 11, further comprising:
    determining whether the object will remain in contact with the input or whether the object will immediately move away from the input; and
    ignoring the presence of the object when it is determined that the object will immediately move away from the input.

15. The method of claim 11, further comprising:
    determining a degree to which the object is contacting the input; and
    determining an amount by which to increase the power level based on the degree to which the object is contacting the input.

16. The method of claim 11, wherein increasing the power level at which the transmitter transmits the signals is independent of signal quality measurements of signals received at the wireless device.

17. The method of claim 11, further comprising transmitting a request to a paired device, the request causing an increase in power level of signals transmitted from the paired device to the wireless device.

18. A system, comprising:
    a first device; and
    a second device configured to wirelessly communicate with the first device, the second device comprising:
        a transmitter configured to transmit signals, wherein the transmitter transmits the signals at a first power level;
        an input comprising one or more touch sensors; and
        a control unit in communication with the one or more touch sensors and the transmitter, the control unit configured to:
            detect presence of an object contacting the input; and
            increase a power level at which the transmitter transmits the signals in response to detecting the presence of the object.

19. The system of claim 18, wherein the second device is further configured to transmit a request to the first device, the request causing an increase in power level of signals transmitted from the first device to the second device.

20. The system of claim 18, wherein the first and second devices communicate via short range wireless communication.

* * * * *